No. 789,953. PATENTED MAY 16, 1905.
F. G. ATWOOD.
VETERINARY OPERATING TABLE.
APPLICATION FILED JUNE 18, 1904.
3 SHEETS—SHEET 1.
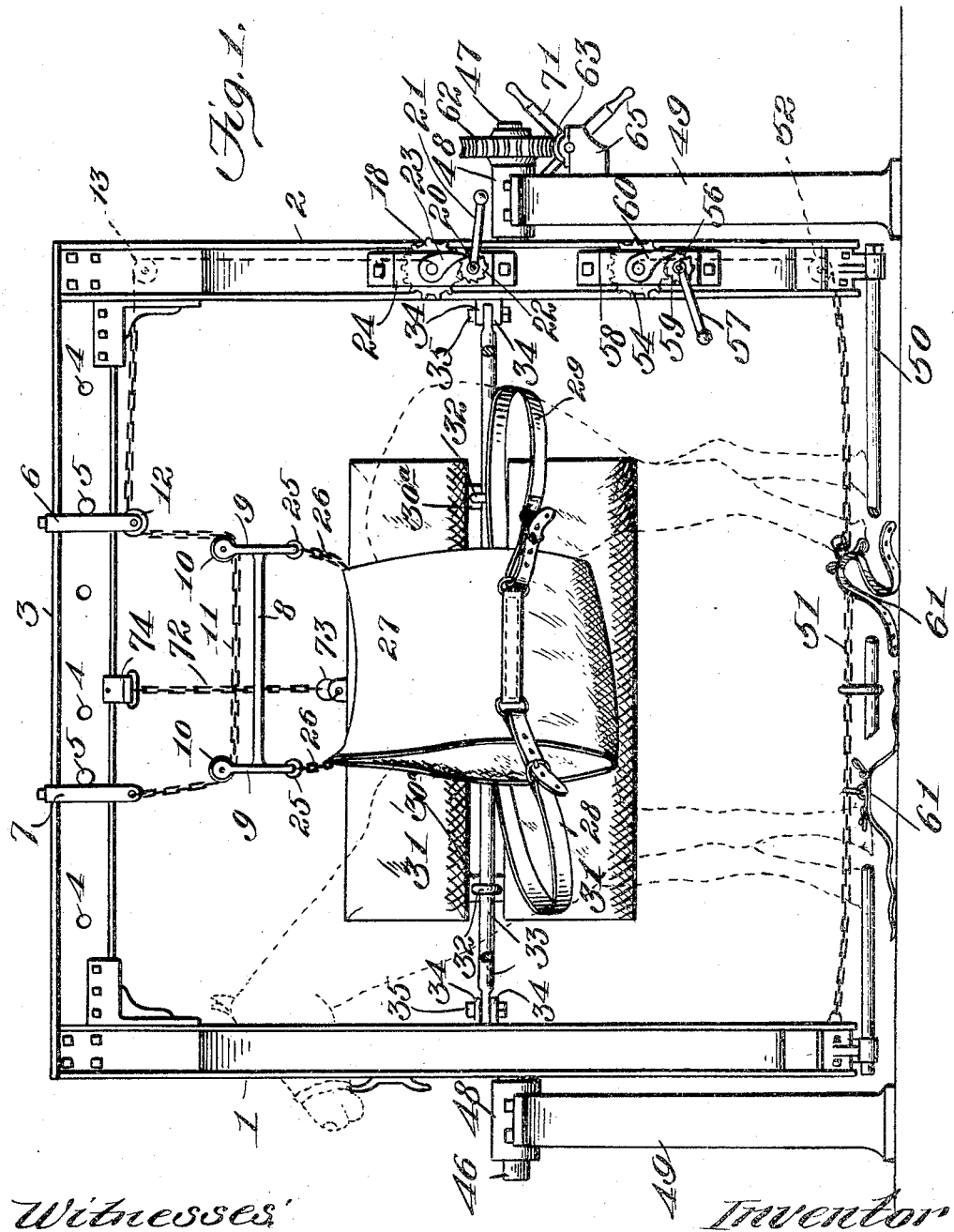

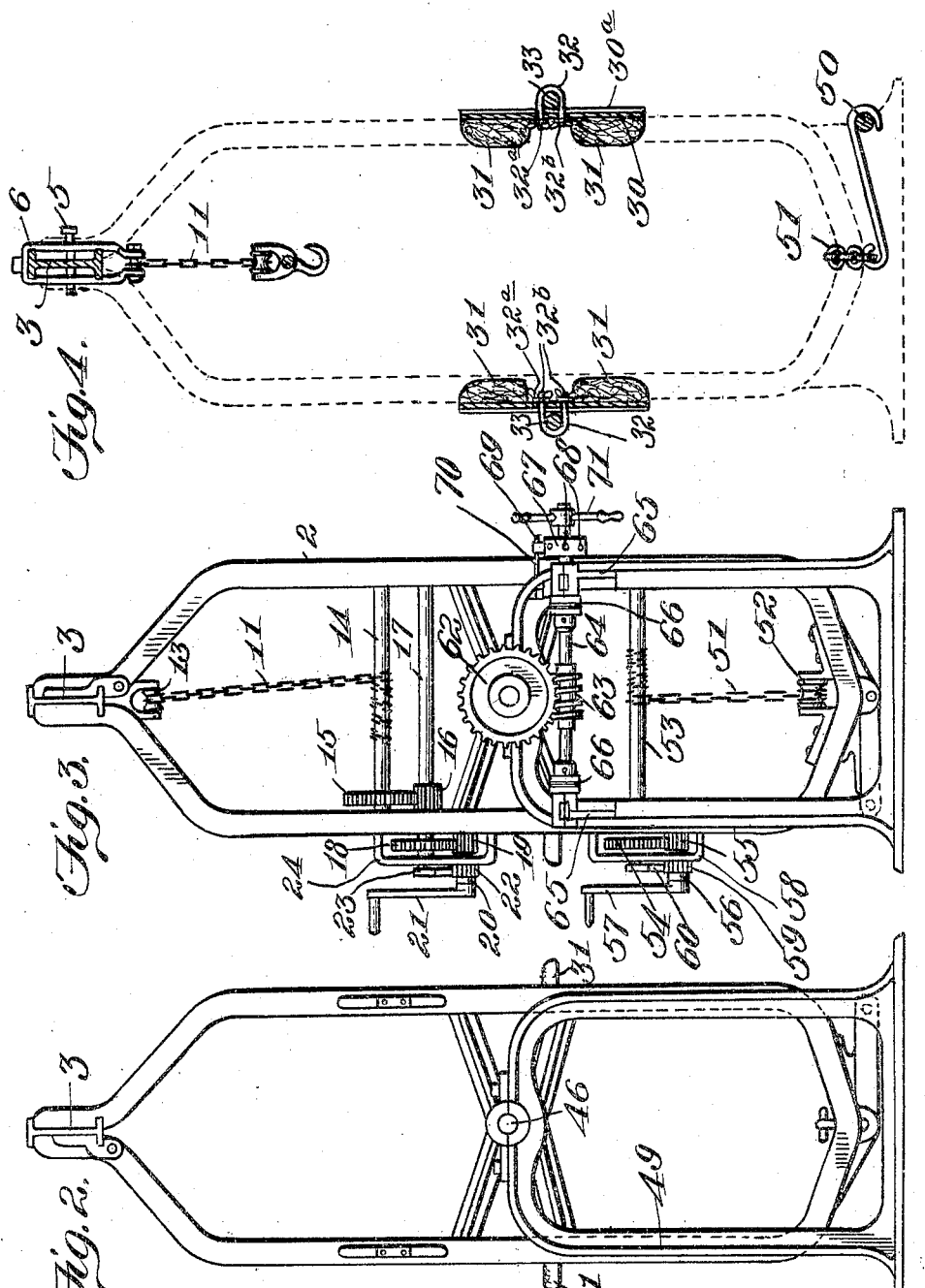

No. 789,953. PATENTED MAY 16, 1905.
F. G. ATWOOD.
VETERINARY OPERATING TABLE.
APPLICATION FILED JUNE 18, 1904.
3 SHEETS—SHEET 3.
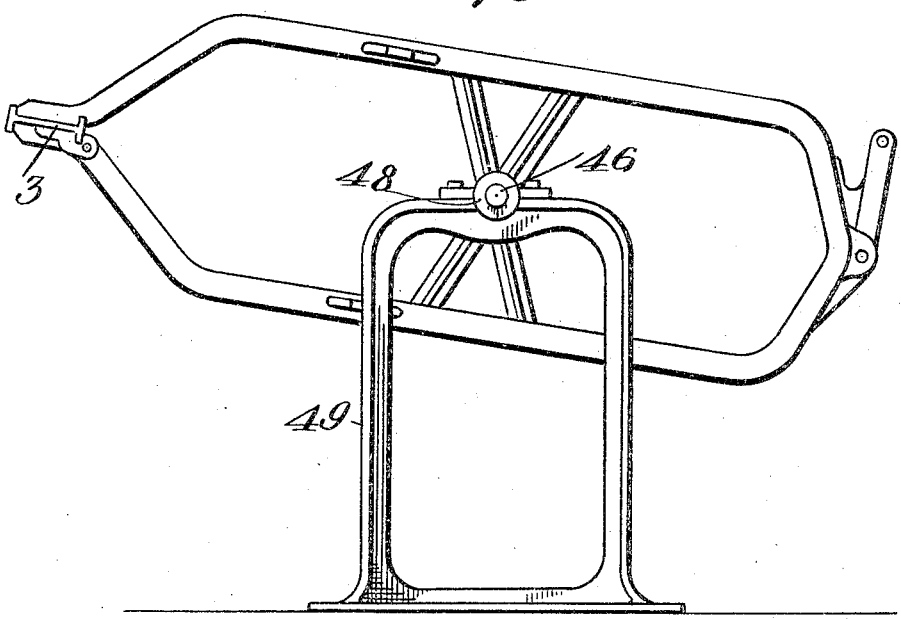
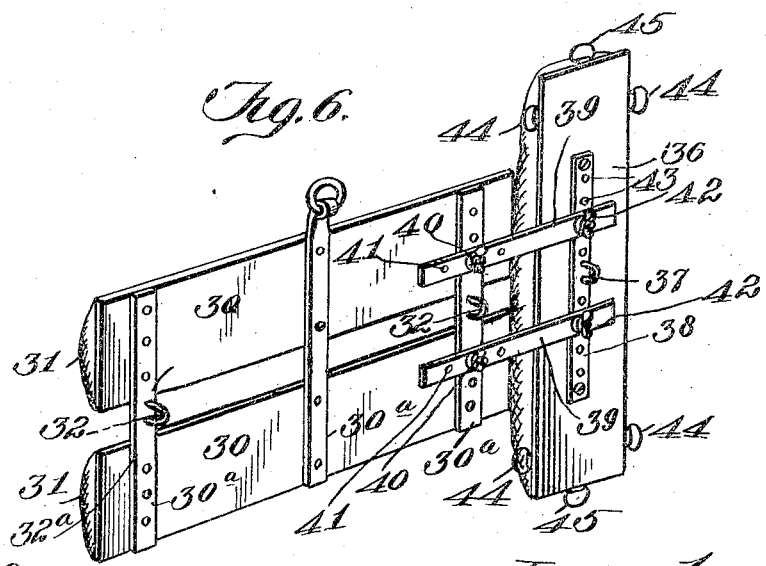
Witnesses
C. D. Kesler,
Dennis Sumby.
Inventor
Frank G. Atwood
By James L. Norris
Atty.

No. 789,953.  
Patented May 16, 1905.

UNITED STATES PATENT OFFICE.

FRANK G. ATWOOD, OF NEW HAVEN, CONNECTICUT.

VETERINARY OPERATING-TABLE.

SPECIFICATION forming part of Letters Patent No. 789,953, dated May 16, 1905.

Application filed June 18, 1904. Serial No. 213,145.

*To all whom it may concern:*

Be it known that I, FRANK G. ATWOOD, a citizen of the United States, residing at New Haven, in the county of New Haven and State of Connecticut, have invented new and useful Improvements in Veterinary Operating-Tables, of which the following is a specification.

This invention relates to veterinary operating-tables wherein a frame or holding means is movably disposed and fulcrumed between uprights or standard devices anchored to a base-rest. The present form of table is equipped with attachments to facilitate the arrangement of the animal in any desired position for performing surgical and shoeing operations. In positioning the table carrying the animal the labor incident to such operation is reduced to a minimum, and after the required adjustment has been obtained the least possible movement of the table, as well as injury to or bodily movement of the animal, is prevented. Furthermore, the table is of such open construction that an operator or surgeon may enter any part thereof from either side or end close to the body of the animal to easily and conveniently perform the necessary operation. The improved table is movable in a complete circle and has readily-operated mechanism for throwing a horse over on either side, downwardly at an angle with the hoofs up, or fully over with the back down and the legs and hoofs in a vertical position. The table in the present instance is also supplied with readily-adjustable auxiliary supporting attachments, which, in part, are specially cushioned and padded to serve as rests for different portions of the body of the animal and easily movable from one position to another with respect to the opposite ends and sides of the table to accommodate the position of the animal and assist in the performance of surgical operations. One of these attachments is specially useful in holding the head and neck of an animal during the administration of an anesthetic, or one limb for special treatment or operation. A part or all of the attachments may be used in the table, and in addition to a sling of ordinary form included in the complement of attachments and having a freely-movable securing means other supporting harness or straps may be introduced, particularly when the table is so arranged that the legs and hoofs of the animal are turned up in vertical position. These additional supporting-straps will be used in this instance to remove the weight strain from the legs of the animal, which under ordinary conditions are secured and firmly held against movement by hopples attached to a part of the table. The possibility of introducing different kinds of harness or straps within the table is an important advantage and is due to the open structure of the several parts of the table and the adjustability and removability of other auxiliaries.

In the drawings, Figure 1 is a view in side elevation of an operating-table embodying the features of the invention. Fig. 2 is an end elevation of the table. Fig. 3 is a view similar to Fig. 2 of the opposite end of the table. Fig. 4 is a transverse sectional view, certain of the parts being omitted and others being shown in dotted lines. Fig. 5 is a view in end elevation showing the table tilted, parts of the latter being omitted to avoid confusion. Fig. 6 is a perspective detail view of an auxiliary supporting device, showing an adjustable attachment adapted to be used therewith.

Similar numerals of reference are employed to indicate corresponding parts in the several views.

The table comprises, in part, two end frames or supports 1 and 2, which are of open structure and approximately rectangular in form. It is preferred that these frames be constructed from angle or I beams, the upper ends of the beams being drawn together and connected to a supporting-beam 3, as clearly shown by Figs. 2 and 3. The converged extremities of the frames 1 and 2 may be attached to the supporting-beam 3 in any preferred manner, and said beam is also by preference made from angle-iron, having a cross-sectional contour simulating an I-beam. The beam 3 is provided with a series of longitudinally-disposed openings 4 in the web thereof to receive removable pins 5, the latter being used to hold a pair of straps 6 and 7 in adjusted position on the supporting-beam in the operation of the table. A compensating bar, including in its structure a horizontal member 8 and two angular members 9, is held by the straps 6 and 7, the upper ends of the members 9 each carrying a sheave 10, around which passes a chain 11, one end of the chain being secured to the strap 7 and another portion thereof movable over a sheave 12, held by the lower extremity of the strap 6. From the sheave 12 the chain 11 extends longitudinally under the beam 3 and passes over a sheave 13, located in the center of the upper extremity of the end frame or support 2, and from the sheave 13 the chain extends downwardly to a winding element or shaft 14 at a distance below the beam 3. The element or shaft 14 carries the gear 15, which is held in continual mesh with the pinion 16 on an operating-shaft 17 below the element or shaft 14, one end of the shaft 17 projecting outwardly through one of the side members of the end frame 2 and is supplied with the gear 18, meshing with a pinion 19 on a stub-shaft 20. The stub-shaft 20 is actuated by a crank-handle 21 and has thereon a ratchet-wheel 22, coöperating with a pawl 23 to lock the said stub-shaft and the shafts 17 and 14 against movement after an adjustment of the chain 11 has been made. Through the operation of the intermeshing gears described the shaft 14 may be turned to wind and unwind the chain 11 and elevate or lower the compensating bar. The gear 18 and pinion 19 are held within a bearing plate or bracket 24, secured to the adjacent side member of the frame 2, the stub-shaft 20 being supported in operative position by the side member of the frame and bearing plate or bracket.

The lower ends of the members 9 of the compensating bar carry rings or analogous suspending devices 25, to which the ends of suitable chains 26 are secured and also attached to a sling 27 of the usual or any preferred construction, the sling having breast and breeching straps 28 and 29 as in ordinary devices of this class.

The complement of the improved table also includes two supporting-cushions, one of which is shown in detail by Fig. 6, the said supporting-cushions being applied to opposite sides of the table or on only one side, as the operation to be performed may demand. Each cushion is made up of two plates 30, having pads 31 secured to the inner side thereof, the plates and pads being held in spaced relation to cause them to conform readily with the part of the body of the animal with which they contact by end and intermediate tie straps or bars 30ª. The end straps or bars 30ª have centrally-disposed clips 32, secured thereto and held in movable relation through the medium of thumb-screws 32ª, engaging the shanks 32ᵇ of the clips, the said shanks being passed through the intermediate portions of the straps or bars 30ª between the edges of the plates 30. If desired, however, these clips may be of any other well-known form as long as they sufficiently serve as intermediate attaching means. The clips 32 form hinged connections for the supporting-cushions and are engaged by opposite bars 33, which have their ends flattened and removably fitted between ears 34, carried by the opposing faces of the side members of the end frames 1 and 2, bolts 35 being vertically passed through the ears and the bar ends. These bars 33 are of a strong and durable nature and preferably formed from iron or steel, the bowed portions of the bars providing ample space between them to compensate for the projection of the body of the animal placed in the table. While two cushions are shown, it will be understood that only one will generally be employed, the purpose of illustrating two of these devices being to show that the table or apparatus is capable of supporting an animal for operation upon either side, and for this reason, as will presently appear, suitable mechanism is provided for swinging the table-supporting frame in either direction, sidewise or to the right or to the left, as may be required. The cushions set forth may be shifted longitudinally on the bars 33, and in some instances the latter and the cushions may be entirely removed from the remaining features of the table. Each cushion will also have an auxiliary supporting attachment supplied therewith and applicable to either end. This auxiliary attachment consists of an elongated plate 36, to which a central clip 37 is applied to a supporting-strip 38, as shown by dotted lines in Fig. 6, similar to those heretofore described, and also adapted to engage the bar 33 nearest thereto. In addition to the supporting-strap 38 connecting straps or bars 39 are adjustably held in connection with said supporting-strap by large thumb-screws 40, which are adapted to pass through either one of a series of suitable openings 41 in each connecting-bar extremity into the said supporting-strap. The opposite extremities of the connecting-bars are supplied with thumb-screws 42 to engage either of the end straps 30ª of the main cushion, said end straps having a series of openings 43 therein to receive the said screws 42. On the inner side of the plate 36 a cushion or pad is applied, and after this auxiliary attachment for the main supporting-cushion has been secured in operative position the head and neck of the animal undergoing operation may be rested and secured thereon, especially during the administration of an anesthetic or in performing dental operations or in pursuing other delicate operations requiring an absolutely-immovable position of the head of the animal. The auxiliary cushion attachment may be shifted longitudinally by loosening the connecting-bars 39 and projected more above the upper edge of one plate 30 than below the lower edge of the opposite similar plate, or the said auxiliary cushion attachment may be moved very close inwardly toward the ends of the plates 30 or outwardly a greater distance from the latter. This auxiliary attachment is also intended for use in performing delicate operations on one leg of the animal, and in view of the facility with which the said attachment can be applied to either extremity of the main cushion it will be found exceptionally convenient in use with either the fore or hind legs. This auxiliary attachment will also have opposite side eyes or rings 44 and an end ring 45 at one extremity for the reception and fixing of halter or leg straps, and, if desired, this same arrangement of rings or securing-eyes may be applied to the opposite extremity of the attachment, so that it may be reversed with obvious advantages.

The end frames 1 and 2 have intermediate pintles 46 and 47, which are journaled in boxes 48, carried by standards 49, rigidly held against movement by being anchored at their lower extremities in the ground or on any other base-rest on which the table may be erected. The lower ends of the frames 1 and 2 are connected by bar 50, and disposed close to this bar is the ordinary foot-holding chain 51, one end of said chain being flexibly connected in any suitable manner with the end frame 1 and the opposite portion of said chain passed around a sheave or guide-pulley 52, held by the lower end of frame 2 above the bar 50. From the sheave or guide-pulley 52 the chain 51 passes upwardly to a winding-shaft 53, bearing at opposite ends in the side members of the frame 2 below the winding-shaft 14 and its operating mechanism heretofore explained. The shaft 53 projects through one side member of the frame 2 and has a gear 54 keyed thereon and held in continuous mesh with the pinion 55, carried by the stub-shaft 56, projecting outwardly from the frame 2 and operative through the medium of a crank-handle 57. The outer projected end of the shaft 53 and the stub-shaft 56 are held against the side member of the frame 2 by a bearing plate or bracket 58, similar to the bearing plate or bracket 24, and on the stub-shaft 56 is a ratchet-wheel 59, which is engaged by a pawl 60 to provide locking means for preventing the shaft 53 from having movement after the chain 51 has been adjusted as desired. The chain 51 has hopples 61 in the nature of straps attached thereto at regular intervals for the purpose of holding the legs of the animal undergoing operation perfectly rigid or immovable.

One of the most essential features of the present invention is the mechanism for tilting the table to any position and holding it locked after the desired adjustment has been obtained. As before indicated, this table, together with the attachments therein, is adjustable either to the right or left and fully through a circular path. It is obvious that under the control of certain actuating mechanisms the table, especially after an animal had been placed and secured therein, would require considerable manual strength to throw or position the animal at the angle desired. Consequently it is imperative from a standpoint of facility of operation that the necessary concomitants for mechanism for adjusting or operating a table of this class are that they shall combine great strength, ease of operation, freedom from damage in use, and positiveness in holding the table at any desired adjustment. Mechanism having the foregoing requirements in the present instance consists of a worm-wheel 62, secured to the pintle 47 and held in constant mesh with a worm 63, carried by a shaft 64, having bearing in opposite brackets 65 on the adjacent standard 49. The shaft 64 is journaled in suitable ball-bearings 66 to reduce the friction in the operation of such shaft. When a horse is reclining upon either of the cushions, the lateral thrust against the threads of the worm will be excessive, and the provision of these ball-bearings 66 reduces the resistance to movement of the shaft to a minimum. Ordinarily a worm-wheel will be positively locked by the worm which it engages, and no supplemental means need be employed for locking the shaft carrying the worm against rotation. In the present instance, however, it is absolutely necessary that all precautions should be taken to prevent the least struggle of the animal causing the worm to give, and thus allow the position of the animal to be changed, which might result disastrously during the operation. To prevent this accidental movement of the shaft, which might be effected under the weight of the animal, the shaft 64 has keyed or otherwise secured to it a locking-disk 67, peripherally provided with a plurality of sockets 68, to be engaged by a latch or lock 69, carried by an arm 70, secured in any suitable manner to the standard 49. In some instances a ratchet and pawl might be substituted for the locking disk and latch; but it is preferred that the latter be used, and it is intended that the spaces between the sockets shall indicate certain degrees of inclination of the table, which will be most advantageous in performing special or certain operations. To facilitate turning or actuation of the shaft 64, it is provided with a hand-wheel 71.

When the table is overthrown to bring the back of the horse downward, it will be seen that the sling 27 would be ineffective as a supporting means, and to prevent weight strain of the body of the animal being thrown entirely on the legs it is proposed to introduce any suitable harness or supporting-straps that will be passed around the body of the animal and attached to the bar 50. These straps have not been shown, as they will consist of ordinary harness devices or sling-straps well known in the art.

The supporting-cushions are reinforced with holding means when the weight of the animal is imposed thereon through the medium of a stay-chain or analogous flexible connection 72, attached at one end to a ring 73, secured to the projected extremity of the intermediate strap or bar 30ª and at the opposite extremity to clip 74, which is secured to the supporting-beam 3. This chain 72 may be readily detached from the ring 73 when the use of either cushion is undesirable.

In general the operation of the table will be as follows: When it is desired to dispose an animal therein, one or the other of the bars 33 is freed from engagement with the ears 34 of either of the end frames 1 or 2, and the horse or other animal is then led into the frame, after which the bars are secured into position. The sling is then properly disposed about the animal and the breast and breeching straps tightened. The hopples 61 are then secured around the ankles, and the winding-shaft 53 is actuated to tighten the chain 51, and thus securely hold the legs of the animal against movement. The winding-shaft 14 is next actuated, through the mechanism explained, to elevate the sling and lift the animal sufficiently to remove the hoofs from ground contact. The animal being now in proper position to be thrown, the hand-wheel 71 is operated, and the table carrying the animal is swung either to the right or to the left and gradually lifts the feet of the animal from the ground, and at the same time the body will be caused to recline upon the cushion previously adjusted and positioned, together with its auxiliary attachment, if necessary in the operation to be performed. The stay-chain 72 will obstruct the movement of the cushion, and any tendency of the cushion turning will be positively obstructed, so that all danger of variation in the position of the animal will be obviated.

Means will also be provided in connection with one or both of the end frames for attaching halter-straps or other head-harness, and great care will be exercised in the formation of the several parts as to distances apart to overcome any tendency to injury of the animal during his retention within the table. It will also be understood that the animal may be either led or backed into the table, and after the operation has been performed the release of the animal is pursued reversely to the steps just described in securing him.

Having thus described the invention, what is claimed is—

1. In an apparatus of the class described, the combination with a table, of means for moving the same through a complete circle, and means for locking the table at any desired adjustment.

2. In an apparatus of the class described, the combination with a table, of means for moving the same through a complete circle in opposite directions, and means for locking the table at any desired adjustment.

3. In an apparatus of the class described, the combination with a table, of a worm-wheel operatively connected therewith, a worm meshing with the worm-wheel, and means for operating the worm and locking it at predetermined adjustments.

4. In an apparatus of the class described, the combination with a table, of a worm-wheel operatively connected therewith, a shaft carrying a worm meshing with the worm-wheel, said shaft being supported in ball-bearings, a disk carried by the shaft and having sockets spaced to determine certain inclinations of the table, locking means for engaging the sockets when a predetermined adjustment has been secured, and means for actuating the worm-shaft.

5. In an apparatus of the class described, the combination of a table inclosing bars removably attached to opposite portions of the table, a cushion-rest adjustably and removably applicable to either bar, a body-supporting device, leg and foot attaching means, and means for swinging the table in opposite directions.

6. In an apparatus of the class described, the combination with a table movable through a complete circle in opposite directions, of a rest-cushion removably and adjustably applicable to either side of the table, and devices for sustaining the weight of the body and securing the legs of an animal.

7. In an apparatus of the class described, the combination with a table movable through a complete circle in opposite directions, of cushion means for receiving the side of the body of an animal, a central cushion means being applicable to either side of the table, and means for securing the animal within the table.

8. In an apparatus of the class described, the combination of a table movable in opposite directions, side bars having their opposite ends removably connected to the end portions of the table, a rest-cushion means removably and adjustably applicable to one or both side bars, and a sling adjustable longitudinally in the table and provided with means for raising and lowering the same.

9. In an apparatus of the class described, the combination with a table movable in opposite directions, of a rest-cushion having an auxiliary cushion attachment at the end thereof, said auxiliary cushion attachment being adjustable longitudinally and transversely with respect to the main cushion.

10. In an apparatus of the class described, the combination with a table movable in opposite directions, of a rest-cushion applicable to either side thereof and having an elongated end cushion adjustably attached to one extremity of the same and provided with devices for receiving securing means.

11. In an apparatus of the class described, the combination with a table movable in opposite directions, of a rest-cushion applicable to either side of the table and having an end auxiliary cushion adjustably secured thereto.

12. In an apparatus of the class described, the combination with a movable table, of a worm-wheel operatively connected therewith, a shaft carrying a worm meshing with said worm-wheel, and means for locking the shaft against movement and preventing accidental movement of the shaft by the weight carried by the table.

13. In an apparatus of the class described, the combination with a table movable in opposite directions, of a worm-wheel operatively connected therewith, a shaft having a worm meshing with the said worm-wheel and also carrying a disk with sockets in the periphery thereof, and a latch for engaging the sockets of the said disk.

In testimony whereof I have hereunto set my hand in presence of two subscribing witnesses.

FRANK G. ATWOOD.

Witnesses:
FREDERICK L. COVELL,
HENRY W. MERWIN.